US009995418B2

(12) United States Patent
Irwin et al.

(10) Patent No.: US 9,995,418 B2
(45) Date of Patent: Jun. 12, 2018

(54) BULKHEAD FITTING ASSEMBLY

(71) Applicant: The Boeing Company, Chicago, IL (US)

(72) Inventors: James P. Irwin, Renton, WA (US); David W. Minteer, Lake Tapps, WA (US); Benjamin A. Johnson, Lynnwood, WA (US); Erik W. Dowell, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 282 days.

(21) Appl. No.: 14/733,187

(22) Filed: Jun. 8, 2015

(65) Prior Publication Data

US 2015/0276101 A1    Oct. 1, 2015

Related U.S. Application Data

(62) Division of application No. 13/166,371, filed on Jun. 22, 2011, now Pat. No. 9,080,694.

(51) Int. Cl.
*F16L 11/127*    (2006.01)
*F16L 19/028*    (2006.01)
(Continued)

(52) U.S. Cl.
CPC ............ *F16L 19/0286* (2013.01); *B64C 1/10* (2013.01); *F16L 5/06* (2013.01); *F16L 5/08* (2013.01);
(Continued)

(58) Field of Classification Search
CPC ....... F16L 19/0286; F16L 57/06; F16L 23/18; F16L 23/036; F16L 23/028; F16L 19/02;
(Continued)

(56) References Cited

U.S. PATENT DOCUMENTS 333,413 A * 12/1885 Hoeveler ............... F16L 23/167
                                                                 285/45 X
1,505,279 A    8/1924 Mueller et al.
(Continued)

FOREIGN PATENT DOCUMENTS

BE           637028      12/1963
CN        201141488      10/2008
(Continued)

OTHER PUBLICATIONS

CA, Office Action; Canadian Patent Application No. 2,834,070; 3 pages (dated Feb. 21, 2017).
(Continued)

*Primary Examiner* — Gregory J Binda
(74) *Attorney, Agent, or Firm* — Thompson Hine LLP

(57) ABSTRACT

A bulkhead fitting assembly that includes a tube, a mounting flange attachable to a bulkhead, a thermal shell joining the mounting flange and the tube and having a portion spaced away from the tube forming an air pocket between the tube and the thermal shell, a plurality of mounting studs extending from the mounting flange away from the thermal shell, and a plurality of bushings positioned between the mounting studs and the bulkhead. The plurality of bushings are each shaped to complete a current path from the tube to the plurality of mounting studs, from the plurality of mounting studs to the plurality of bushings, and from the plurality of bushings to the bulkhead. Nuts are threaded on the studs to secure the fitting assembly by sandwiching the bulkhead between the mounting flange and the bushings, which are retained by the nuts.

20 Claims, 9 Drawing Sheets

(51) Int. Cl.

| | | |
|---|---|---|
| *F16L 5/06* | (2006.01) | |
| *F16L 5/08* | (2006.01) | |
| *B64C 1/10* | (2006.01) | |
| *F16L 5/12* | (2006.01) | |
| *F16L 19/02* | (2006.01) | |
| *F16L 23/028* | (2006.01) | |
| *F16L 23/12* | (2006.01) | |
| *F16L 23/22* | (2006.01) | |
| *F16L 25/02* | (2006.01) | |
| *F16L 23/036* | (2006.01) | |
| *F16L 23/18* | (2006.01) | |
| *F16L 57/04* | (2006.01) | |

(52) U.S. Cl.
CPC ............... *F16L 5/12* (2013.01); *F16L 19/02* (2013.01); *F16L 23/028* (2013.01); *F16L 23/036* (2013.01); *F16L 23/12* (2013.01); *F16L 23/18* (2013.01); *F16L 23/22* (2013.01); *F16L 25/026* (2013.01); *F16L 57/04* (2013.01); *F16L 2201/40* (2013.01); *Y10T 29/49826* (2015.01); *Y10T 29/49948* (2015.01)

(58) Field of Classification Search
CPC ......... F16L 25/026; F16L 23/12; F16L 23/22; F16L 5/12; F16L 5/06; F16L 5/08; F16L 2201/40
USPC .......... 285/45–47, 907; 244/135 R; 411/546; 126/314, 317
See application file for complete search history.

(56) References Cited

U.S. PATENT DOCUMENTS

| | | | |
|---|---|---|---|
| 2,382,970 A * | 8/1945 | Borcherdt | F16L 5/08 126/317 |
| 2,424,208 A | 7/1947 | Poupitch | |
| 2,427,431 A | 9/1947 | Wieland | |
| 3,227,475 A * | 1/1966 | Sinkinson | B64D 13/00 244/135 R |
| 3,576,330 A | 4/1971 | Gard | |
| 5,201,549 A | 4/1993 | Davey | |
| 5,433,183 A | 7/1995 | Vansnick | |
| 5,568,947 A * | 10/1996 | Paquette | E04F 17/04 285/46 X |
| 5,970,960 A | 10/1999 | Azuma | |
| 6,145,888 A | 11/2000 | Ohmi et al. | |
| 6,173,701 B1 | 1/2001 | Azuma | |
| 6,209,153 B1 | 4/2001 | Segien, Jr. | |
| 6,293,265 B1 | 9/2001 | Gagnon | |
| 6,719,294 B2 | 4/2004 | Nguyen et al. | |
| 6,726,161 B2 * | 4/2004 | Plump | B05B 15/065 285/46 X |
| 7,857,567 B2 * | 12/2010 | Iwata | B62D 25/147 411/546 X |
| 2008/0116319 A1 | 5/2008 | Negley et al. | |
| 2008/0308476 A1 | 12/2008 | Silverstein et al. | |
| 2010/0123307 A1 | 5/2010 | Coronado | |
| 2010/0199650 A1 | 8/2010 | Hassdenteufel | |

FOREIGN PATENT DOCUMENTS

| | | |
|---|---|---|
| FR | 2706976 | 12/1994 |
| WO | 98/15765 | 4/1998 |

OTHER PUBLICATIONS

CA, Office Action, Canadian Application No. 2,834,070, dated Oct. 19, 2015.
EP, Examination Report, European Patent Application No. 12725961.2 (dated Feb. 19, 2016).
US, Non-Final Office Action, U.S. Appl. No. 14/733,158, 9 pages (dated May 17, 2017).
US, Final Office Action, U.S. Appl. No. 14/733,158, 20 pages (dated Feb. 3, 2017).
US, Non-Final Office Action; U.S. Appl. No. 14/733,158 (dated Nov. 27, 2015).
US, Non-Final Office Action, U.S. Appl. No. 14/733,158 (dated Aug. 25, 2016).
US, Final Office Action, U.S. Appl. No. 14/733,158 (dated May 3, 2016).
PCT, International Search Report and Written Opinion, International Application No. PCT/US2012/038836 (dated Aug. 31, 2012).
CN, English translation of Office Action and Search Report; Chinese Patent Application No. 2015109192694; 6 pages (dated Apr. 27, 2017).
US, Advisory Action, U.S. Appl. No. 14/733,158 (dated Jul. 25, 2016).
US, Notice of Allowance; U.S. Appl. No. 14/733,158; 8 pages (dated Sep. 27, 2017).

* cited by examiner

BULKHEAD FITTING ASSEMBLY

TECHNICAL FIELD

The disclosure relates to bulkhead fittings for sealing bulkhead openings, and more specifically, bulkhead fittings used in sealing bulkhead openings in composite structure aircraft.

BACKGROUND

Bulkhead fittings are used as part of a conduit system to pass a conduit, tube, or other similar apparatus through a fluid-impermeable barrier or bulkhead and maintain the integrity of the barrier. These barriers or bulkheads may be employed to form fuel tanks, climate-controlled spaces, air containment units, and other enclosures intended to segregate either a liquid or a gas from a surrounding environment. These bulkhead fittings are furnished with redundant seals to prevent external fluid transfer or leakage through the bulkhead around the tube by means of O-rings, fay, and fillet seals.

A bulkhead fitting traditionally functions by providing a robust and reliable connection to structure allowing fluid to be transmitted across the interface through a transport element tube. In hydraulic systems, the hydraulic fluid (and therefore hydraulic transfer element tube) may become heated to high temperatures. Such high temperatures may damage bulkhead, barrier, or other surrounding structure if there is a direct connection between the transfer element tube and the heat-sensitive structure. Heat may also deform or modify the interface between the bulkhead and conduit and compromise the sealing features of the fitting. Therefore, bulkhead fittings have been developed that thermally insulate the fitting and connected conduit from a bulkhead on which the fitting is mounted to prevent thermal damage to the bulkhead.

One example of such thermal insulation is the use of a plastic insulator between the fitting and bulkhead. This barrier may be up to an inch thick on either side of the fitting in order to provide sufficient insulation to prevent damage to the bulkhead. Another example is to provide a fitting with a wide, thermally conductive surface to dissipate heat without creating a localized area of high temperature.

With the use of composite materials for aircraft, it may be necessary to utilize hydraulic conduits to transfer electrical energy from lightning strikes, precipitation static, and other electromagnetic events (EME). Because thermal insulating materials also tend to be electrically insulating, such structures may not allow a combined solution of thermal non-conductivity (to resist the flow of heat) and electrical conductivity (to pass the flow of electrical current from fitting to bulkhead) in the properties of the insulating materials in a hydraulic bulkhead fitting. To provide for electrical conductivity while providing thermal insulation, electric current may be diverted away from the hydraulic line.

Further, Federal Aviation Regulation (FAR) 25.981 requires a redundant system so that any single failure combined with a latent failure cannot result in an ignition source within the fuel tank of an aircraft. There is therefore recognized a need in the art for an improved bulkhead fitting assembly that satisfies FAR 25.981.

One method of overcoming this restriction has been the use of additional components included with a bulkhead fitting installation. However, installing these additional parts can add time and weight to a bulkhead fitting installation to provide for protection against spark propagation. There is therefore a need for a bulkhead fitting assembly that addresses the aforementioned shortcomings and others that may exist in prior art devices.

SUMMARY

In one embodiment, the disclosed bulkhead fitting assembly may include a tube; a mounting flange attachable to a bulkhead; a thermal shell joining the mounting flange and the tube, the thermal shell having a portion spaced away from the tube forming an air pocket between the tube and the thermal shell; a plurality of mounting studs extending from the mounting flange away from the thermal shell; a plurality of bushings positioned between the plurality of mounting studs and the bulkhead, the plurality of bushings each shaped to complete a current path from the tube to the plurality of mounting studs, from the plurality of mounting studs to the plurality of bushings, and from the plurality of bushings to the bulkhead; and a plurality of nuts received on the adapter to lock the fitting assembly in place by sandwiching the bulkhead between the mounting flange and the plurality of nuts, wherein the plurality of nuts is in engagement with the plurality of bushings.

In another embodiment, the disclosed bulkhead fitting assembly may include a tube; a mounting flange attachable to a bulkhead; a thermal shell joining the mounting flange and the tube, the thermal shell having a portion spaced away from the tube forming an air pocket between the tube and the thermal shell adjacent the mounting flange; a plurality of mounting studs extending from the mounting flange away from the thermal shell, the plurality of mounting studs positioned to be inserted through corresponding openings in the bulkhead; a plurality of bushings positioned between the plurality of mounting studs and the bulkhead; and a plurality of nuts received on the adapter to lock the fitting assembly in place by sandwiching the bulkhead between the mounting flange and the jam nut, wherein the jam nut is in engagement with the bushing; and an O-ring received by the mounting flange and positioned to engage the bulkhead, thereby preventing fluid from leaking past the bulkhead.

In yet another embodiment, the disclosed bulkhead fitting assembly may include a tube having a perimeter shoulder; a mounting flange attachable to a bulkhead; a thermal shell attached to the mounting flange and to the perimeter shoulder of the tube, the thermal shell having a portion spaced away from the tube and forming an air pocket between the tube and the thermal shell adjacent the mounting flange; a plurality of threaded mounting studs extending from the mounting flange away from the thermal shell, the plurality of mounting studs positioned to be inserted through corresponding openings in the bulkhead; a plurality of bushings positioned between the plurality of mounting studs and the bulkhead; and a plurality of nuts, wherein each of the plurality of nuts is threaded onto threads of a threaded portion of each of the plurality of mounting studs that extends beyond the bulkhead adapter to lock the fitting assembly in place by sandwiching the bulkhead between the mounting flange and the jam nut, wherein the jam nut is in engagement with the bushing; and wherein each of the plurality of bushings is shaped to complete a current path from the tube to the plurality of mounting studs, from the plurality of mounting studs to the plurality of bushings, and from the plurality of bushings to the bulkhead.

Other objects and advantages of the disclosed bulkhead fitting assembly will be apparent from the following description, the accompanying drawings, and the appended claims.

DETAILED DESCRIPTION

Figure 1:
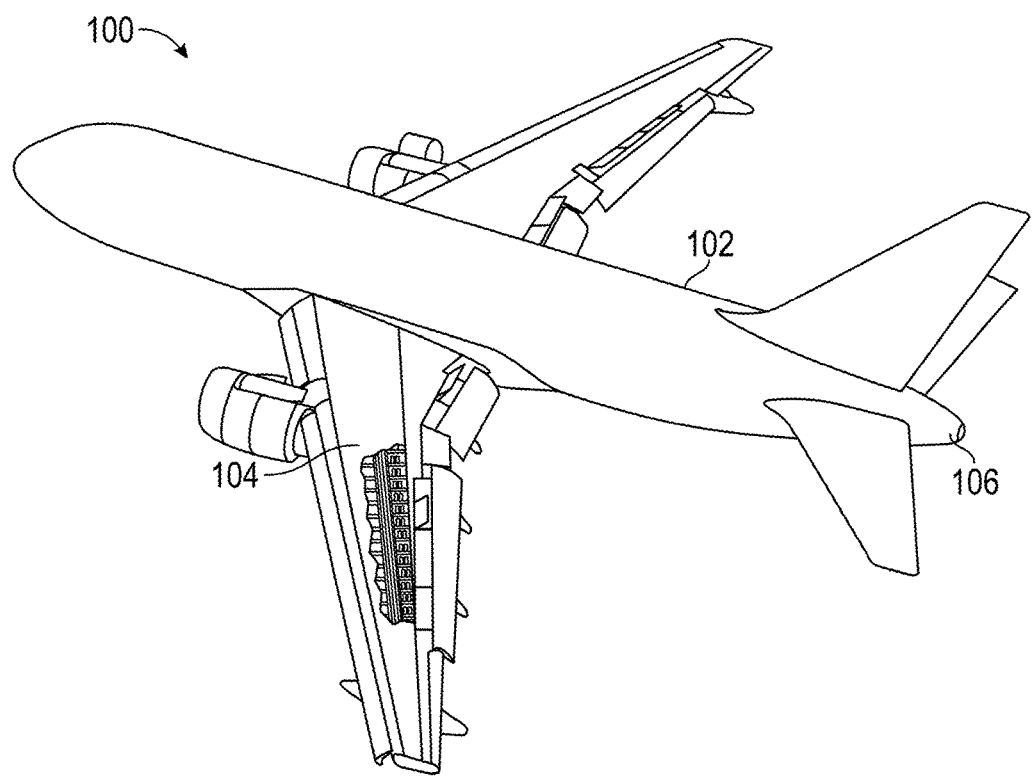
FIG. 1 is a perspective view of an aircraft, partially broken away to show bulkheads having the disclosed bulkhead fitting assembly.
Figure 2:
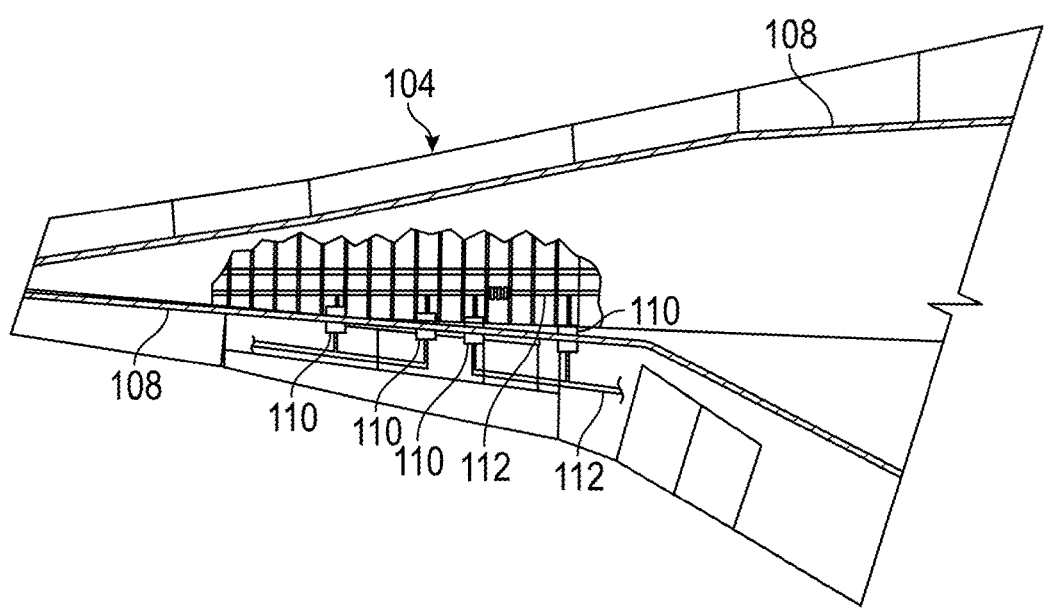
FIG. 2 is detail top plan view of a wing of the aircraft of FIG. 1, broken away to show the disclosed bulkhead fitting assembly.

FIG. 1 shows an aircraft 100 according to one embodiment of the disclosed bulkhead fitting assembly. The aircraft 100 may include a fuselage 102, wings 104, and a tail 106. The wings 104 may include tanks to store fuel for the aircraft 100. As shown in FIG. 2, inside the wings 104 the tanks may have bulkheads 108 to isolate the fuel from the rest of the aircraft 100. As further shown in FIG. 2, a number of hydraulic conduits 112 may pass through the bulkhead 108 with each hydraulic conduit 112 including a bulkhead fitting assembly 110.

While the bulkhead fitting assembly 110 is generally described as utilized in concert with an aircraft 100, and in particular an aircraft made of carbon fiber reinforced polymer (CFRP), it is understood that the bulkhead fitting assembly 110 may be used in other non-aircraft vehicles, including industrial vehicles (e.g., lift trucks), spacecraft, construction vehicles (e.g., earthmoving equipment), amphibious vehicles (e.g., hovercraft), and marine vessels, such as surface ships, boats, and submarines. Further, the bulkhead fitting assembly 110 may be used in non-hydraulic applications, including electrical conduits, water conduits, and pneumatic conduits. Further, the disclosed bulkhead fitting assembly may be used with other conduits, tubes, and apparatus that pass through a bulkhead 108 or other barrier.

Figure 3A:
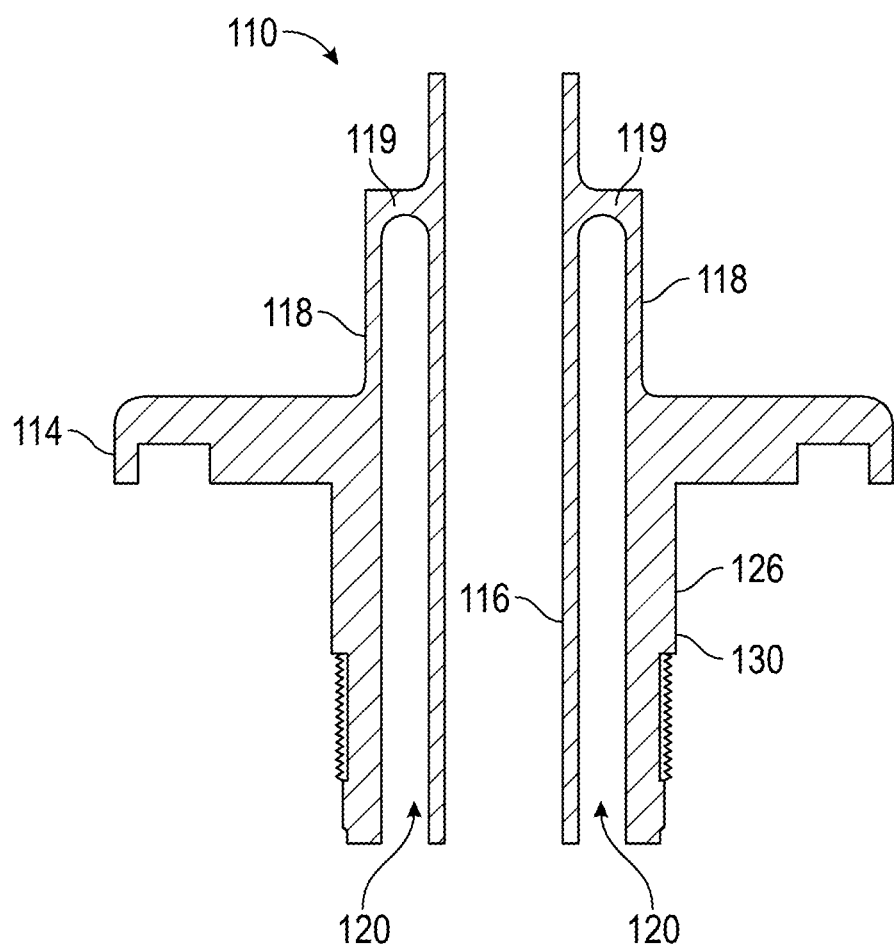
FIG. 3A is a side elevation in section of an embodiment of the disclosed bulkhead fitting assembly.
Figure 3B:
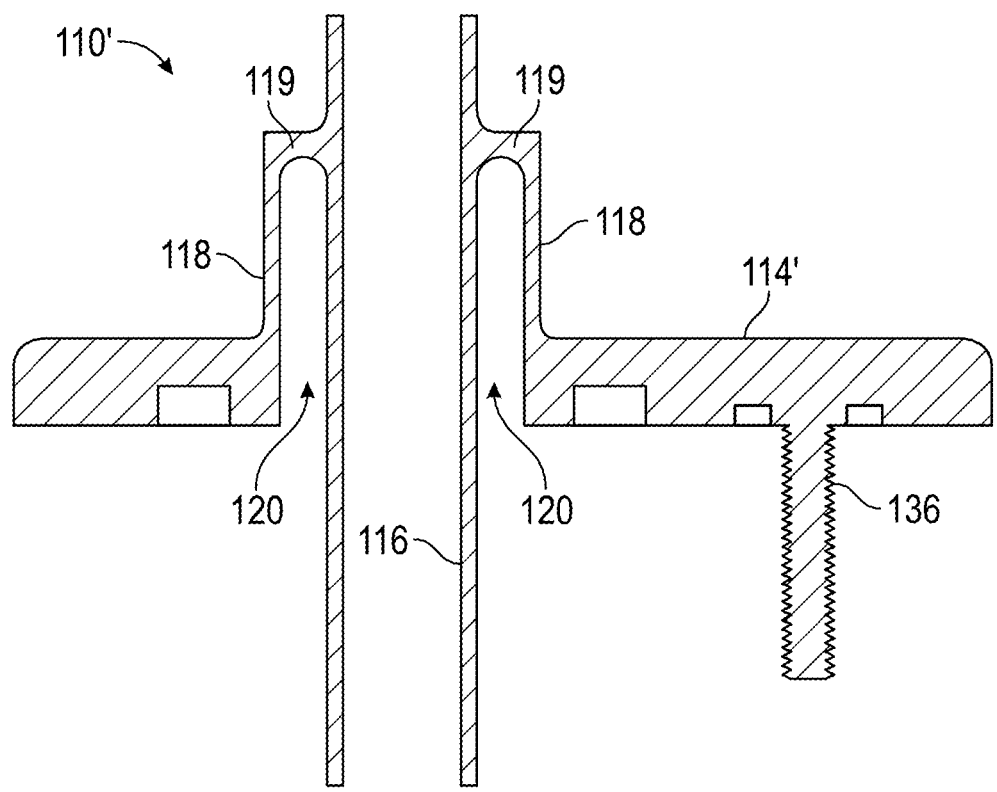
FIG. 3B is a side elevation in section of another embodiment of the disclosed bulkhead fitting assembly.

FIGS. 3A and 3B illustrate embodiments of the disclosed bulkhead fitting assembly 110, 110'. As shown in FIG. 3A, the bulkhead fitting assembly 110 may include a mounting flange 114 shaped to be attached to the bulkhead 108 (see FIG. 4A) and a tube 116 that may form part of the conduit 112 (see FIG. 2). The tube 116 may be joined to the mounting flange 114 by a thermal shell 118 that limits heat transfer between the tube and mounting flange. The mounting flange 114 may having a central opening for receiving the tube 116 therethrough, may extend radially away from the tube 116, and may include a cylindrical shell extending axially away from the central opening.

As is well known in the art, the amount of heat that can be transferred through a thermal path is dependent in part on the cross sectional area of the thermal path, length, and thermal conductivity of the material in the path. The thermal path in the bulkhead fitting assembly 110 through which heat transfer is limited is the thermal shell 118. By reducing the cross sectional area of the thermal shell 118 and the thermal conductivity of the material comprising the thermal shell, the amount and rate of heat transferred to the bulkhead 108 may be reduced. By adjusting the length of the thermal shell 118, the heat transferred through the shell 118 may be controlled to protect the bulkhead 108. Heat transferred through the thermal shell 118 to the mounting flange 114 and bulkhead 108 may be dissipated from the bulkhead 108 to the surrounding environment, further reducing the risk of exposing the bulkhead 108 to high temperatures.

In an embodiment, the cross sectional area of the thermal shell 118 may be reduced to minimize heat transfer through the thermal shell. The thermal shell 118 may be thin and preferably may be constructed from a material having relatively high mechanical strength to enable adequate transfer of mechanical load from the tube 116 to the mounting flange and bulkhead 108. To enable a continuous, all-metal design, allowing for electrical conductivity, the material preferably may be selected to be welded or brazed so that the shell 118 may be constructed of separate pieces and manufactured. To conduct electrical current from tube 116 to the mounting flange 114 and bulkhead 108, a material with relatively high electrical conductivity may be selected. To resist heat transfer, a material with relatively low thermal conductivity may be selected. One type material that meets these requirements is a titanium alloy. When made from this material, a bulkhead fitting 110 may be a single-piece welded part. Other materials that may be considered include corrosion-resistant steel alloys.

As further shown in FIG. 3A, the thermal shell 118 may be spaced away from the tube 116 to form an air pocket 120 between the tube 116 and thermal shell 118. This air pocket 120 may promote heat transfer away from the thermal shell 118, thereby reducing the chance of the mounting flange 114 reaching a sufficient temperature to damage the bulkhead 108. This air pocket 120 may be open to the space outside the tank and sealed from the inside of the tank to provide a fluid barrier. The air pocket 120 may be positioned inside the tank (thereby inverting the fitting), but preferably may be outside the tank so that it does not fill up with fluid.

A shoulder 119 connects the tube 116 to the shell 118. The shoulder 119 is shaped to transfer the mechanical load from the tube 116 to the shell 118 without mechanical failure of tube 116 and shell 118 (for example, cracking of a weld or breaking the shell 118) and to resist deflection of the tube 116. The shoulder 119 also prevents the tube 116 from bottoming out across the air pocket 120 if the tube 116 is shifted or displaced during normal operation. The tube 116 adjoining the shoulder 119, the shoulder 119, and the shell 118 are sized to transfer the mechanical load from the tube through the shoulder 119 and shell 118 to the flange 114 without mechanical failure of the tube 116, flange 114, or shoulder 119 and to resist deflection of the tube 116, thereby preventing the tube 116 from bottoming out across the air pocket 120.

Figure 4A:
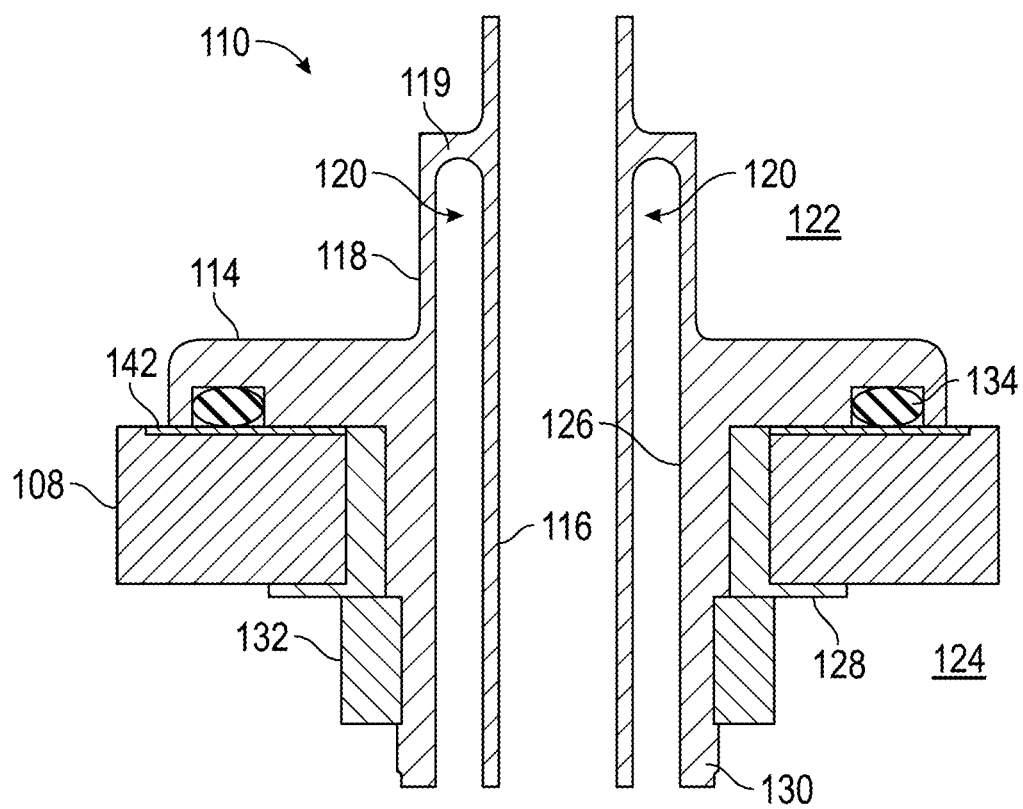
FIG. 4A is a side elevation in section the bulkhead fitting assembly of FIG. 3A.

FIG. 3A shows a bulkhead fitting assembly 110 that includes an adapter 126 extending away from the mounting flange 114 and away from the thermal shell 118. This adapter 126 may be useful in attaching the bulkhead fitting assembly 110 to the bulkhead 108 with a jamb nut 132 that may be threaded onto threads of a threaded portion 130, as shown in FIG. 4A. The adapter 126 may support a mounting provision (jam nut 132 in this figure) extending through the bulkhead 108. The adapter 126 may include a part that extends beyond the bulkhead 108 that includes the threaded portion 130. A bushing 128 may be inserted between the adapter 126 and bulkhead 108. This threaded portion 130 may receive the jamb nut 132 to lock the fitting 110 in place on the bulkhead 108.

FIG. 3B shows an alternative embodiment of the bulkhead fitting assembly 110'. With this embodiment 110', the adapter 126 (FIG. 4A) may be omitted, and a plurality of mounting studs 136 are provided on flange 114' as an alternative method of attaching the fitting 110' to the bulkhead 108, as shown and described below with reference to FIG. 4B. The plurality of mounting studs 136 may extend away from the thermal shell 118 in an axial direction.

Figure 4B:
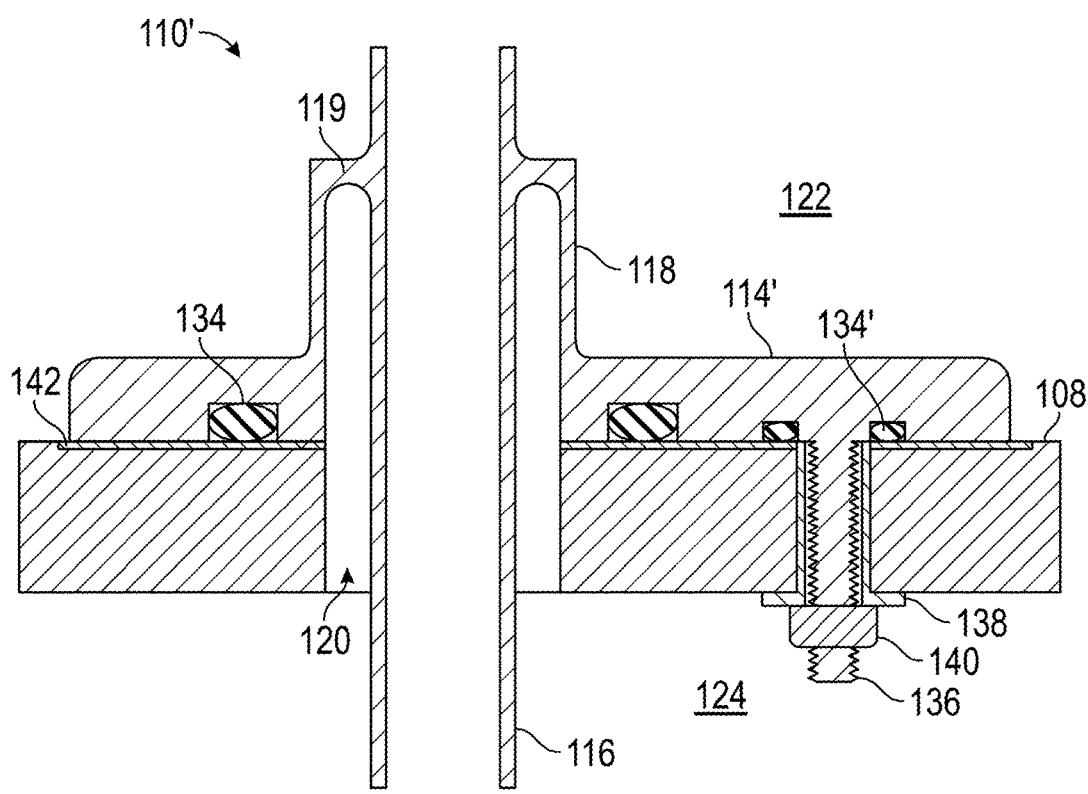
FIG. 4B is a side elevation in section of the bulkhead fitting assembly of FIG. 3B.

FIGS. 4A and 4B show alternative methods of mounting the bulkhead fitting assemblies 110, 110' to the bulkhead 108. The bulkhead 108 may separate a wet side 122 (for example, the inside of a fuel tank) from a dry side 124 (for example an air pocket or outside of a fuel tank) of an enclosure. The mounting flanges 114, 114' may be on the wet side 122 of the bulkhead 108 and the tube 116 may extend through an opening in the bulkhead 108. However, those skilled in the art will appreciate that the bulkhead fitting assemblies 110, 110' may be reversed without departing from the scope of the disclosure.

The bulkhead fitting assembly 110 illustrated in FIG. 4A may include an O-ring 134 that provides additional sealing between the mounting flange 114 and the bulkhead 108. This O-ring 134 functions in a manner that is well known in the art to seal against the fluid passing through any gaps between the mounting flange 114 and bulkhead 108.

The bulkhead fitting assembly 110 may be employed in a method of sealing an opening in a bulkhead 108. This method may include the steps of inserting a bushing 128 through an opening in the bulkhead, and inserting a remainder of the fitting assembly through the opening. The bulkhead fitting assembly 110 may include a tube 116 for carrying, for example, hydraulic fluid, a mounting flange 114, and an adapter 126 for securing the fitting assembly to the bulkhead 108. A jamb nut 132 may be attached to the adapter 126, thereby sandwiching the bulkhead 108 between the mounting flange 114 of the fitting 110 and the nut 132. The tube 116 may be connected to the mounting flange 114 by a thin thermal shell 118.

The bulkhead fitting assembly 110 may be held in place on the bulkhead 108 by sandwiching the bulkhead 108 between the mounting flange 114 of the fitting 110 and the jamb nut 132. The pressure provided by this joint deforms the O-ring 134, thereby compressing it into place and preventing fluid from leaking past the bulkhead 108. After assembly, a fillet seal (not shown) may be applied peripherally around the mounting flange 114 to prevent fuel from leaking through the opening in the bulkhead 108 through which the bulkhead fitting assembly 110 passes.

An alternative assembly method is illustrated in FIG. 4B. As shown in this figure, the fitting 110' may include a plurality of mounting studs 136 that extend away from the mounting flange 114' opposite the thermal shell 118; that is, oriented substantially perpendicular to the mounting flange and parallel to the tube 116. These mounting studs 136 may include a threaded segment along their lengths, or may include a threaded segment at least on the portions that extend beyond the bulkhead 108. These threaded segments each may receive one of a plurality of nuts 140 that may lock the fitting in place on the bulkhead 108. The plurality of mounting studs 136 and nuts 140 of the bulkhead fitting assembly 110' may sandwich the bulkhead fitting assembly 110' to the bulkhead 108.

The bulkhead fitting assembly 110' may include a plurality of bushings 138 inserted between the mounting studs 136 and bulkhead 108. These bushings 138 may protect the openings in the bulkhead from the mounting studs 136 during installation and repair of the bulkhead fitting assembly 110'. The bulkhead fitting assembly 110' may include an O-ring 134 about the perimeter of the mounting flange 114' in a single piece and/or include O-rings 134' about the perimeters of the openings in the bulkhead 108 for the tube 116 and each of the plurality of mounting studs 136 in separate individual pieces. After assembly, a fillet seal (not shown) may be applied peripherally around the mounting flange 114' to prevent fuel from leaking through the openings in the bulkhead 108.

The improved bulkhead fitting assemblies 110, 110' illustrated in these figures accomplish the objectives of providing a bulkhead seal with a single-piece welded metal part that may be substantially impermeable to fluid transfer from the wet side 122 to the dry side 124 of the bulkhead 108. Further, the bulkhead fitting assemblies 110, 110' may reduce heat transfer from the tube 116 to the mounting flanges 114, 114', thereby reducing the potential for heat damage to the bulkhead 108. The reduction in heat transfer may be achieved by a thin metal shell 118 that may be strong enough to transfer the mechanical load from the tube to the mounting flanges 114, 114', respectively, without structural failure. The bulkhead fitting assemblies 110, 110' may provide a peripherally continuous metal path for conducting electric current from the tube 116 directly to the bulkhead 108, thereby shielding the interior of a tank from electrical discharge occurring in the environment outside of the tank and eliminating the need for additional structure to conduct electric current to the bulkhead 108.

When secured to the bulkhead 108, the bushings 128, 138 may provide an all-metal interface, creating an electrical connection through the bulkhead fitting assemblies 110, 110' between the bulkhead 108 and tube 116. The all-metal interface of the bulkhead fitting assemblies 110, 110' may assist in providing lightning strike protection by creating a current path from tube 116 to the adapter 126 and stud 136, respectively, from the adapter and stud to the bushings 128, 138, respectively, and from the bushings to the bulkhead 108. The bulkhead fitting assemblies 110, 110' resist sparking during the transfer of current. As either the jamb nut 132 or nuts 140 are in engagement with both the bulkhead fitting assemblies 110, 110', and bushings 128, 138 (respectively, as shown in FIGS. 4A and 4B), an all-metal spark resistant bond path to the fitting bulkhead fitting assemblies 110, 110' through the jam nut 132, or nuts 140, respectively, is provided.

An additional element that may be included is a thin-walled dielectric layer 142 that may further isolate the bulkhead 108 from the mounting flanges 114, 114' of the bulkhead fitting assemblies 110, 110', respectively. This thin-walled dielectric layer 142 may provide electrical insulating advantages to prevent possible sparking from the flanges 114, 114' to the bulkhead 108 inside a tank, for example. The dielectric layer 142 may encompass the full mounting surface and extend a specified distance outside the perimeter of the mounting surface. The thin-walled dielectric layer 142 may be either integrated into the bulkhead or integrated into the bulkhead fitting assemblies 110, 110'.

A fillet seal (not shown) may be provided around the perimeter of the mounting flanges 114, 114' during assembly to provide a mechanical barrier against leakage of fluid through the impermeable bulkhead barrier. Sealant (not shown) also may be applied around each nut 132, 140 and each bushing 128, 138. The fillet seal also may provide a barrier against sparks that may develop in the interface between the bulkhead fitting assemblies 110, 110' and bushings 128, 138, and bulkhead 108.

The combination of all-metal connection from tube to bushing, O-ring seal, and fillet seal provided in the installation of the bulkhead fitting may ensure that the bulkhead fitting assemblies 110, 110' complies with FAR 25.981 by providing at least three independent features for the prevention of spark propagation within, for example, a fuel tank.

Accordingly, a method of sealing an opening in a bulkhead 108 with the bulkhead fitting assembly 110 may include inserting the tube 116 through the bulkhead opening; and placing the mounting flange 114 against the bulkhead. With the bulkhead fitting assembly 110, the mounting flange 114 may be attached to the thermal shell 118, the thermal shell attached to the tube 116, and the mounting flange attached to the adapter 126 so that the adapter extends away from the mounting flange and from the thermal shell through the opening. An air pocket if formed by spacing a portion of the thermal shell 118 away from the tube 116. The bushing 128 is placed on the adapter 126 such that the bushing completes a current path from the tube 116 to the adapter 118, from the adapter to the bushing 128, and from the bushing to the bulkhead 108. The jam nut 132 may be tightened on the adapter 126 to sandwich the bulkhead 108 between the mounting flange 114 and the bushing 128 to form a seal between the mounting flange and the bushing to seal the opening.

Similarly, a method of sealing an opening in a bulkhead 108 with the bulkhead fitting assembly 110' may include inserting the tube 116 through the bulkhead opening, and placing the mounting flange 114' against the bulkhead. With the bulkhead fitting assembly 110', the mounting flange 114' may be attached to the thermal shell 118, and the thermal shell attached to the tube 106 by shoulder 119. The plurality of mounting studs 136 may be attached to the mounting flange 114' to extend away from the mounting flange and thermal shell 118 through the bulkhead 108. The an air pocket 120 may be formed by spacing a portion of the thermal shell 118 adjacent the flange 114' away from the tube 116. A plurality of bushings 138 may be placed on the plurality of mounting studs 136 such that the plurality of bushings completes a current path from the tube 116 to the mounting flange 114', from the mounting flange to the plurality of bushings 138, and from the plurality of bushings to the bulkhead 108. The plurality of nuts 140 is tightened on the plurality of mounting studs 136, respectively, to sandwich the bulkhead 108 between the mounting flange 114' and the plurality of bushings 138 to form a seal between the mounting flange and the plurality of bushings to seal the opening.

Figure 5A:
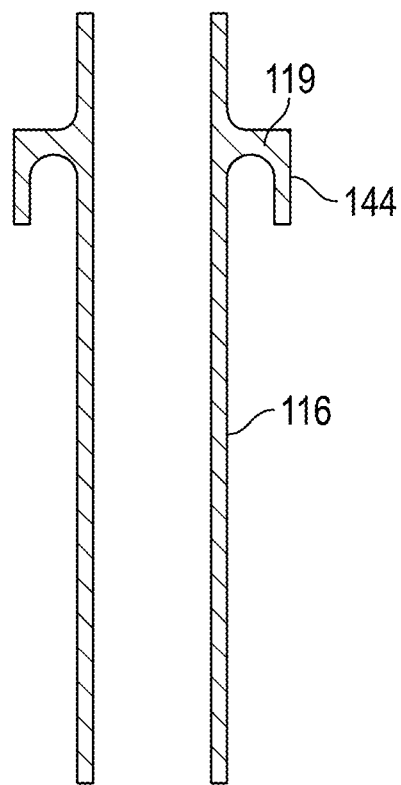
FIG. 5A is a side elevation in section of a component of the bulkhead fitting of FIG. 3A.

A novel method of constructing the hydraulic bulkhead fitting 110 is disclosed for a continuous metal part. As shown in FIG. 5A, a tube 116 may be provided having a perimeter shoulder 144 extending radially outward from the tube 116. This perimeter shoulder 144 may form the first part of the thermal shell 118 (FIG. 3A).

Figure 5B:
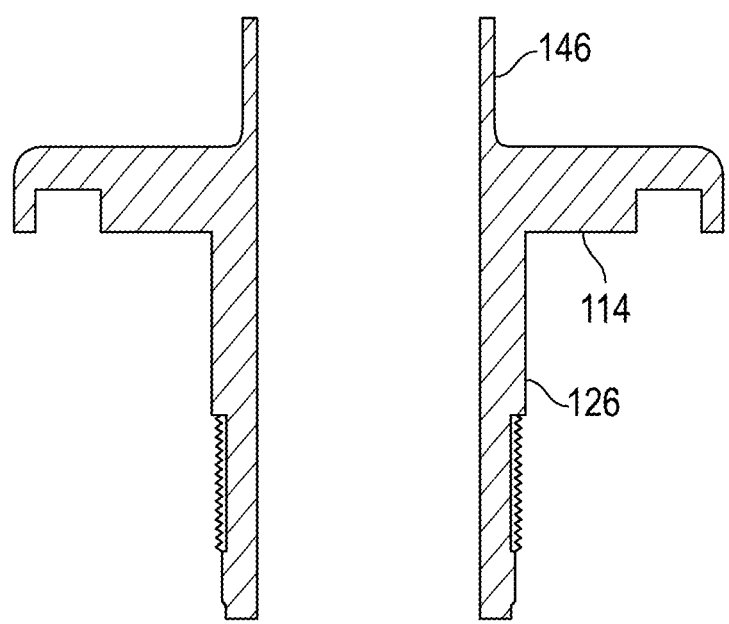
FIG. 5B is a side cutaway view of another component of the bulkhead fitting of FIG. 3A.

As shown in FIG. 5B, a mounting flange 114 may be provided having a cylindrical shell 146 extending axially away from the mounting flange 114. This cylindrical shell 146 may be thin and may form the second part of the thermal shell 118 (FIG. 3A). The adapter 126 may be shaped to be attached to and extend away from the mounting flange 114 and from the cylindrical shell 146.

Figure 5C:
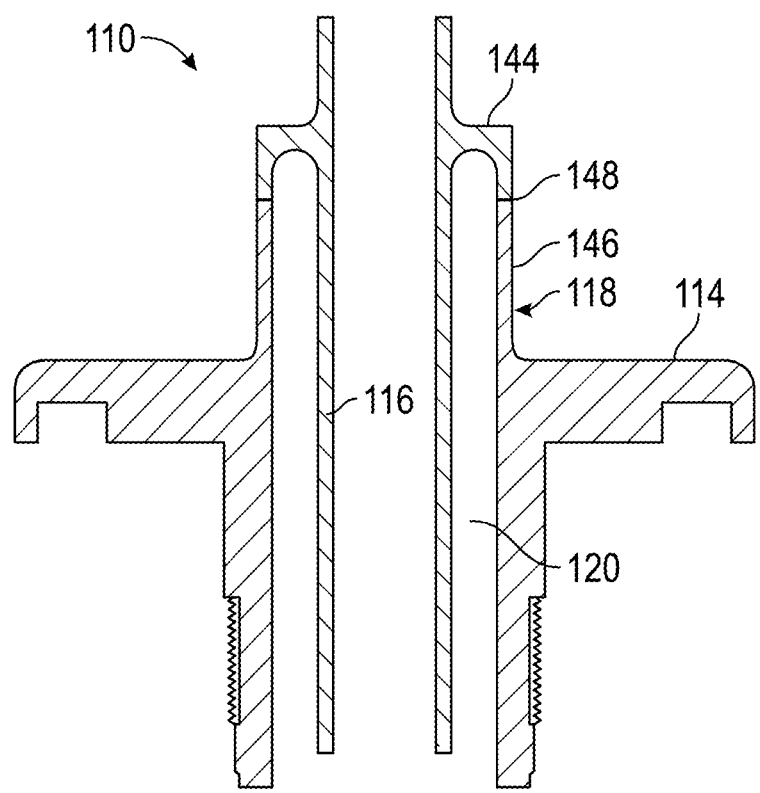
FIG. 5C is a side elevation in section a fitting assembled from the components of FIGS. 5A and 5B.

As shown in FIG. 5C, the mounting flange 114 and tube 116 are joined by a perimeter weld 148 between the perimeter shoulder 144 of the tube 116 and the cylindrical shell 146 of the mounting flange 114. This perimeter weld 148 may join the tube 116 and mounting flange 114 together, thereby forming an all-metal fitting that provides a complete thermal shell 118 and maintains an air pocket 120 (see also FIG. 4A) between the thermal shell 118 and tube 116, with a continuous metal peripheral barrier from tube 116 to bulkhead 108 for leakage prevention and electrical shielding.

While the disclosed bulkhead fitting assemblies 110, 110' have been described in detail, it should be apparent to those having skill in the art that a number of obvious variations may be made without departing from the scope of the disclosure. Any descriptions are used as examples and are not intended to be limiting of the scope of the disclosure. Detailed dimensions are the result of analysis that includes maximum hydraulic temperature and structural temperature limitations, and other performance conditions. Any limitations will appear in the claims as allowed.

What is claimed is:

1. A bulkhead fitting assembly comprising:
   a tube;
   a mounting flange attachable to a bulkhead;
   a thermal shell joining the mounting flange and the tube, the thermal shell having a portion spaced away from the tube to form an air pocket between the tube and the thermal shell;
   a plurality of mounting studs extending from the mounting flange away from the thermal shell, such that the plurality of mounting studs extend through corresponding openings in the bulkhead when the mounting flange is placed against the bulkhead;
   a plurality of bushings positioned on each mounting stud of the plurality of mounting studs, between each of the mounting studs of the plurality of mounting studs and the bulkhead to extend through the bulkhead when the mounting flange is placed against the bulkhead;
   a plurality of nuts received on the plurality of mounting studs to lock the fitting assembly in place by sandwiching the bulkhead between the mounting flange and the plurality of bushings, wherein the plurality of nuts is in engagement with the plurality of bushings; and
   wherein each bushing of the plurality of bushings contacts one of the plurality of nuts to complete a current path from the tube to the mounting flange, to the plurality of mounting studs, to the plurality of nuts, and from the plurality of bushings to the bulkhead, thereby resisting sparking from the mounting flange to the bulkhead.

2. The bulkhead fitting assembly of claim 1, wherein the air pocket is adjacent the mounting flange.

3. The bulkhead fitting assembly of claim 1, wherein each of the plurality of mounting studs is positioned to be inserted through a corresponding opening in the bulkhead.

4. The bulkhead fitting of claim 1, wherein each of the plurality of bushings is positioned to be inserted in a corresponding one of the holes in the bulkhead.

5. The bulkhead fitting of claim 1, wherein each of the plurality of bushings is inserted over a corresponding one of the mounting studs.

6. The bulkhead fitting assembly of claim 1, wherein each of the plurality of nuts is threaded onto threads of a threaded portion of each of the plurality of mounting studs that extends beyond the bulkhead.

7. The bulkhead fitting assembly of claim 1, wherein the thermal shell includes a shoulder connecting the tube to a remainder of the thermal shell, the shoulder is substantially perpendicular to the tube, and the plurality of mounting studs is oriented substantially perpendicular to the mounting flange and parallel to the tube.

8. The bulkhead fitting of claim 7, wherein the shoulder is shaped to transfer a mechanical load from the tube to the thermal shell, and to prevent the tube from bottoming out across the air pocket.

9. The bulkhead fitting assembly of claim 1, further comprising an O-ring received by the mounting flange and positioned to engage the bulkhead, thereby preventing fluid from leaking past the bulkhead.

10. The bulkhead fitting assembly of claim 9, wherein the O-ring extends about a perimeter of the mounting flange in a single piece.

11. The bulkhead fitting of claim 1, further comprising a plurality of O-rings positioned about each of the plurality of mounting studs, thereby preventing fluid from leaking past the bulkhead.

12. The bulkhead fitting assembly of claim 1, further comprising a dielectric layer positioned between the mounting flange and the bulkhead, and shaped such that sparking from the flange to the bulkhead is prevented.

13. The bulkhead fitting assembly of claim 1, wherein the bulkhead fitting assembly is included in a hydraulic conduit.

14. The bulkhead fitting assembly of claim 1, wherein the bulkhead fitting assembly is included in an electrical conduit.

15. The bulkhead fitting assembly of claim 1, wherein the bulkhead fitting assembly is made of a material with a relatively low thermal conductivity and a relatively high electrical conductivity.

16. The bulkhead fitting assembly of claim 1, wherein the tube, the thermal shell, and the flange are made of a single-piece welded part.

17. The bulkhead fitting assembly of claim 1, wherein the bulkhead fitting is made of a material selected from a titanium alloy and a corrosion-resistant steel alloy.

18. A bulkhead fitting assembly comprising:
a tube;
a mounting flange attachable to a bulkhead;
a thermal shell joining the mounting flange and the tube, the thermal shell having a portion spaced away from the tube to form an air pocket between the tube and the thermal shell adjacent the mounting flange;
a plurality of mounting studs extending from the mounting flange away from the thermal shell, the plurality of mounting studs positioned to be inserted through corresponding openings in the bulkhead when the mounting flange is placed against the bulkhead;
a plurality of bushings positioned on the plurality of mounting studs between each mounting stud of the plurality of mounting studs and the bulkhead to extend through the bulkhead when the mounting flange is placed against the bulkhead; and
a plurality of nuts, each nut of the plurality of nuts received on one of the mounting studs to lock the fitting assembly in place by sandwiching the bulkhead between the mounting flange and the bushings, wherein the plurality of nuts is in engagement with the plurality of bushings; and
an O-ring received by the mounting flange and positioned to engage the bulkhead, thereby preventing fluid from leaking past the bulkhead.

19. The bulkhead fitting assembly of claim 18, wherein each bushing of the plurality of bushings contacts one of the plurality of nuts to complete a current path from the tube to the mounting flange, from the mounting flange to the plurality of mounting studs, from the plurality of mounting studs to the plurality of nuts, from the plurality of nuts to the plurality of bushings, and from the plurality of bushings to the bulkhead, thereby resisting sparking from the mounting flange to the bulkhead.

20. A bulkhead fitting assembly comprising:
a tube having a perimeter shoulder;
a mounting flange attachable to a bulkhead;
a thermal shell attached to the mounting flange and to the perimeter shoulder of the tube, the thermal shell spaced away from the tube to form an air pocket between the tube and the thermal shell adjacent the mounting flange;
a plurality of threaded mounting studs extending from the mounting flange away from the thermal shell, the plurality of mounting studs positioned to be inserted through corresponding openings in the bulkhead when the mounting flange is placed against the bulkhead;
a plurality of bushings mounted on the plurality of mounting studs and positioned between the plurality of mounting studs and the bulkhead to extend through the bulkhead when the mounting flange is placed against the bulkhead;
a plurality of nuts, wherein each of the plurality of nuts is threaded onto threads of a threaded portion of each of the plurality of mounting studs that extends beyond the bulkhead adapter to lock the fitting assembly in place by sandwiching the bulkhead between the mounting flange and the plurality of bushings, wherein the plurality of nuts is in engagement with the plurality of bushings; and
wherein each of the plurality of bushings completes a current path from the tube to the mounting flange, from the mounting flange to the plurality of mounting studs, from the plurality of mounting studs to the plurality of nuts, from the plurality of nuts to the plurality of bushings, and from the plurality of bushings to the bulkhead, thereby resisting sparking from the mounting flange to the bulkhead.

* * * * *